April 14, 1970     R. D. ANWYL     3,506,782

STATUS DISPLAY SYSTEM AND CATHODE RAY TUBE THEREFOR

Filed Nov. 9, 1966

ROBERT D. ANWYL
INVENTOR.

BY *Robert W Hampton*
*Ronald S Kosehen*

ATTORNEYS

United States Patent Office 3,506,782
Patented Apr. 14, 1970

3,506,782
STATUS DISPLAY SYSTEM AND CATHODE RAY TUBE THEREFOR
Robert D. Anwyl, Rochester, N.Y., assignor to Eastman Kodak Company, Rochester, N.Y., a corporation of New Jersey
Filed Nov. 9, 1966, Ser. No. 593,191
Int. Cl. H04n 5/74
U.S. Cl. 178—7.87                                8 Claims

ABSTRACT OF THE DISCLOSURE

A cathode ray tube display system in which the faceplate of the cathode ray tube is formed of photochromic optical fibers with a dichroic filter located behind the faceplate to reflect visible light and transmit ultraviolet light and with a phosphor layer coated on the rear surface of the dichroic filter. Light directed toward the front of the faceplate is either absorbed by the photochromic fibers, or it is reflected by the dichroic filter projected onto a screen, so that the image on the cathode ray tube is reproduced on the screen in an enlarged image with increased contrast.

---

Figure 1:
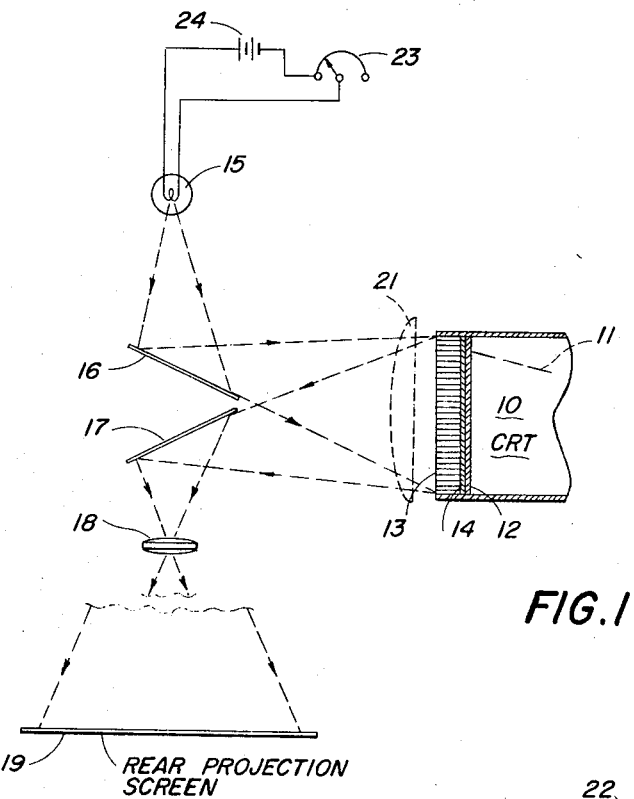

The present invention relates to cathode ray tube display systems and more particularly to a novel cathode ray tube useful in such systems in which the display image on the face of the tube is converted, as by a rear projection system, to a much larger visible image.

In certain military and commercial status display systems, e.g., a plan position indicator (PPI) display for radar or sonar, it is highly desirable for tactical reasons to provide a visible display larger than the image formed on the face of a cathode ray tube, and for this purpose a variety of means have been devised and utilized. One arrangement is to project and magnify by optical means a visible image on the face of the tube onto a larger display area such as a rear projection screen. However, it is not always practical to relay the image through a simple optical system because of limitations to the brightness achievable on the phosphor screen of such tubes. It thus becomes necessary by some intermediate means to achieve a substantial increase in illumination.

One general approach is to utilize as an intermediate means a photosensitive material which after exposure to the display image is developed and projected by a conventional optical projector. This approach, however, introduces an undesirable time delay between generation of the status image and its actual display.

Other approaches include the reduction of light loss by constructing the face plate of the display tube with optical fibers having their ends within the tube coated with phosphor as is fully described in United States Patent No. 3,141,106 to Kapany.

Applicant is aware of an optical projection system employing a cathode ray tube having a phosphor screen that emits strongly in the near ultraviolet and a fiber-optic face plate which transmits the emitted light to a plastic photochromic film through a dichroic filter which passes ultraviolet light and reflects visible light, the arrangement being such that the photochromic film acquires an optical density distribution related directly to the ultraviolet image on the phosphor screen. Simultaneously, visible light on the other side of the photochromic film is directed through the photochromic film to be reflected back by the dichroic filter, again transmitted through the photochromic film and then relayed by conventional optics to a rear projection display screen. The double transit of the visible light through the photochromic film increases the apparent contrast of the photochromic, ultraviolet-formed image as viewed on the display screen.

The objects of the present invention include the efficient translation of an image generated in a phosphor layer to a visible image in an arrangement conducive to being relayed to a display screen by conventional optics.

In accordance with the present invention a significant improvement in the general type of system last described is accomplished by making the fiber-optic face plate of the cathode ray tube of photochromic material, preferably photochromic glass, the inner surface of which is first coated with a multilayer dichroic filter upon which is deposited an ultraviolet emitting phosphor. For convenience the term ultraviolet as used herein may include the visible near ultraviolet.

Figure 2:
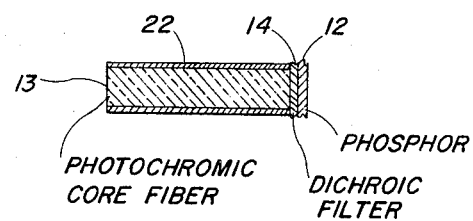
Figure 3:
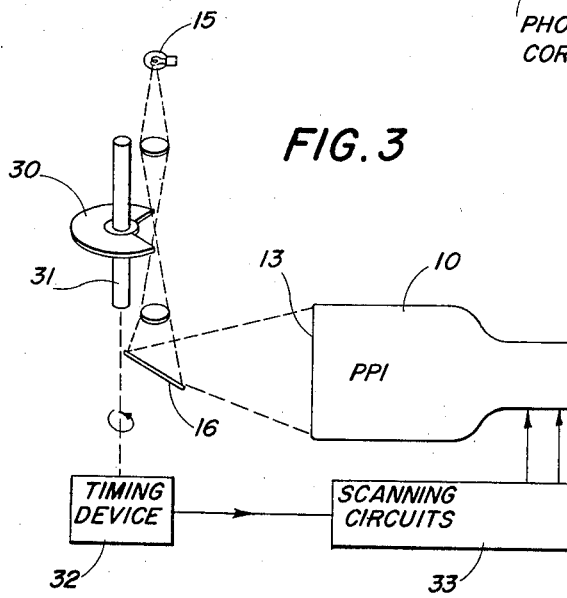

For a better understanding of the invention together with further advantages thereof, reference is made to the following description taken in connection with the accompanying drawing wherein:

FIG. 1 is an elevational view, partly in section, of a cathode ray tube display system utilizing a cathode ray tube incorporating a photochromic fiber-optic face plate in accordance with the invention, FIG. 2 is a longitudinal sectional view of an individual optical fiber unit suitably coated to accomplish the basic object of the invention, and FIG. 3 is a fragmentary view of another embodiment of the invention.

The status display system shown in FIG. 1 employs a cathode ray tube in which a conventional scanning electron beam generates an image in a phosphor layer, and it will be obvious to one skilled in the art that the manner in which the image is generated may comprise any conventional means. As shown in FIG. 1 a cathode ray tube 10 has an electron beam 11 which by conventional techniques scans a phosphor layer 12 while being modulated in accordance with the video information to be displayed. The face of the cathode ray tube 10 is formed by an array of optical fibers 13 of photochromic material, the inner faces of the fibers 13 being coated with a dichroic filter material 14 which in turn supports the phosphor layer 12. The photochromic material which forms at least the cores of the fibers 13 is suitably a glass suspension of silver halide particles which acquires a visible optical density when exposed to ultraviolet light such as the phosphor layer 12 is adapted to emit. The dichroic filter 14 may be formed by an evaporating technique and typically is multilayered and so constructed in a known manner that it passes ultraviolet light and reflects visible light. Visible light from a suitable source 15 is directed as by a mirror 16 onto the face of the display tube 10 transits the optical fibers 13 to be reflected by the dichroic filter 14 back through the fibers 13 and may by conventional optics such as a mirror 17 and a lens 18 be projected greatly enlarged onto an image fixing surface such as a rear projection screen 19. As was suggested above, the double transit of the projecting light through the image formed in the photochromic fiber face 13 increases the apparent contrast of the image as viewed on the screen 19.

Inasmuch as the optical density in the photochromic fibers 13 produced by ultraviolet exposure may be erasable by exposure to bright visible light, particularly at long wavelengths, it is evident that by proper choice of the light source 15 the act of projecting the photochromic image performs the additional desirable function of destroying the image so that it may be replaced by another image representative of changes taking place in the event being displayed. The photochromic material thus functions in the manner of a storage medium having a continuously failing memory. Thus, by selecting or controlling the spectral composition of the projecting light, the time interval of the viewed image may be varied. One simple arrangement for adjusting the spectral composition of the light emitted by an incandescent source 15 is shown in FIG. 1 as comprising a rheostat 23 in series with a source of power 24 energizing the source 15.

In the projection system shown in FIG. 1 a field lens 21 indicated in broken lines may be employed but because the fiber optic face 13 tends to yield a diffuse rather than a specular image a field lens is not a necessity in this particular system. Also, the tube face 13 may itself be curved to accomplish certain desired optical purposes.

The individual optical fiber unit shown in FIG. 2 makes use of a known structure of surrounding the photochromic fiber core 13 with a layer or sheath of lower refractive index material 22 for increasing the efficient conductance of light. Also shown are the dichroic filter 14 and the phosphor coating 12 on the inner face of the fiber unit 13. Other techniques and structures are known for providing cathode ray tubes with fiber optics face plates, one of which is described by Fyler in U.S. Patent No. 3,237,039, but applicant is unaware of any such face plate utilizing photochromic optical fibers for the purpose of the present invention.

In the embodiment of the invention shown in FIG. 3 the episcopic projection optics have been omitted as unnecessary to the understanding of this embodiment. As here shown there is interposed in the light path between the source 15 and the face 13 of the display tube 10 a means 30 for altering the spectral composition of the light illuminating the tube face 13 as desired and preferably in time relation with changes in the image to be displayed. In the case of a sector scan radar or sonar system, i.e., less than 360° scanning, the light altering means would conveniently pass to the tube face 13 light predominantly in the most visible wavelengths lying between deep red and light blue during a "status" display of the scanned sector and would between scans temporarily pass to the face of the tube 13 light predominating or wholly in the longer wavelengths found most effective for erasing or destroying the optical image formed in the photochromic material comprising the face 13 of the tube 10.

Referring now to FIG. 3 the light altering means comprises a disc 30 a major sector of which is made of a material predominately transparent to the above identified most visible wavelengths and a minor sector of which is at least transparent to the photochromic image-erasing wavelengths. The disc 30 is rigidly mounted on a shaft 31 connected to be rotated by a suitable timing device 32 which in the desired time relation therewith provides a timing pulse to scanning circuits 33 which deflect the electron beam 11 (see FIG. 1) to provide the PPI display. With this arrangement the displayed image deteriorates very little before it is fully composed or formed.

The invention of course is not limited to any particular type of display, although it has been described in connection with a PPI display. Photochromic glass is available in which a change in state or a recovery may be obtained in a fraction of a second, such as 0.1 to one second, and such recovery times are acceptable in a status display system as a radar PPI presentation in which each display may be composed in 3 to 10 seconds.

Glass is preferred for the photochromic material partly because of its strength but mainly for its ability to undergo a substantially greater number of reversals than known photochromic plastics. If frequent replacement of the photochromic material were required, it would not be practicable to make the fiber-optic face plate of the tube 10 of photochromic material and hence additional surfaces would be required in derogation of the optical efficiency of the system.

Available photochromic glass has substantially neutral density and accordingly readily lends itself to projection in color by utilizing suitably filtered projection systems in a well known manner. Furthermore, the technology of constructing dichroic filters has advanced to an extent that custom made filters can be had with sharp transmission cutoffs at almost any selected wavelength. It thus becomes feasible to assemble a color projection system wherein the colors are selected directly by the several dichroic filters rather than by filters inserted in the several light beams employed, thereby reducing light loss by reducing the number of reflecting surfaces.

It is to be understood that the above-described arrangements are illustrative of the application of the principles of the invention. It will be evident to those skilled in the art that many modifications may be made without departing from the invention the scope of which is pointed out in the appended claims.

I claim:
1. A cathode ray tube display system, comprising:
   a cathode ray tube having:
      a front faceplate comprising optical fibers formed of photochromic material,
      the optical density of which increases upon exposure to ultraviolet light,
      a dichroic filter substantially transparent to ultraviolet light and substantially reflective to visible light, said filter being positioned behind said faceplate, and
      an ultraviolet-emitting phosphor layer sensitive to electrons, said layer being located behind said dichroic filter,
   a first optical system for directing visible light through said factplate to said dichroic filter, and
   a second optical system for projecting an enlarged image of the outer surface of said faceplate.

2. A display system in accordance with claim 1 wherein:
   said first optical system includes means for altering the spectral composition of the light directed through said faceplate.

3. A system in accordance with claim 2 and further including:
   scanning circuits for deflecting the cathode ray in said tube for producing a scanning raster on said phosphor, and
   means for enabling said scanning circuits to deflect the cathode ray in timed relation with said spectral composition altering means.

4. A system in accordance with claim 1 wherein:
   said fibers are constructed of photochromic glass, the ultraviolet-induced optical density of which is erasable by exposure to visible light in the long wavelength region of the spectrum at a significantly more rapid rate than by exposure to visible light restricted to the short wavelength region of the spectrum, and
   means at selected intervals for alternately directing light of said two regions of the spectrum through and first optical system.

5. A projectable-image producing structure for a cathode ray tube comprising:
   a faceplate constructed of parallel optical fibers of photochromic glass which darkens upon exposure to ultraviolet light;
   an electron-sensitive, ultraviolet light-emitting phosphor positioned to direct its emission upon the interior surface of said faceplate; and
   a filter positioned between said phosphor and said faceplate, said filter being substantially transparent to ultraviolet light and substantially reflective to visible light.

6. A projectable-image producing structure according to claim 5 wherein the filter comprises a layer of material on the interior surface of said faceplate, and the ultraviolet emitting phosphor is coated on the opposite side of said layer.

7. In a cathode ray tube display system including a cathode ray tube, a first optical system for directing visible light through the front faceplate of the tube, and a second optical system for projecting an enlarged image of the faceplate, the improvement wherein the tube faceplate comprises optical fibers formed of photochromic material which attenuates the transmission of visible light upon being exposed to ultraviolet light, and wherein a dichroic filter is positioned behind said faceplate for transmitting ultraviolet light and reflecting visible light, and an ultraviolet emitting phosphor layer is positioned behind said dichroic filter.

8. The improvement in claim 7 wherein the dichroic filter is mounted on said faceplate, and the phosphor layer is coated on the opposite side of the dichroic filter.

References Cited

UNITED STATES PATENTS

| | | | |
|---|---|---|---|
| 2,333,969 | 5/1941 | Alexanderson | 178—5.2 |
| 3,385,927 | 5/1968 | Hamann | 178—7.87 |
| 3,400,214 | 9/1968 | Hamann | 178—7.87 |

ROBERT L. GRIFFIN, Primary Examiner

B. L. LEIBOWITZ, Assistant Examiner